Sept. 28, 1948.  W. H. SCOTT  2,450,362
DEVICE FOR ELECTRIC RESISTANCE HEATING
OF METALS AND CONTROLS THEREFOR.
Filed March 2, 1945  2 Sheets-Sheet 1

INVENTOR.
WILLIAM H. SCOTT,
BY John E. Jackson
HIS ATTORNEY.

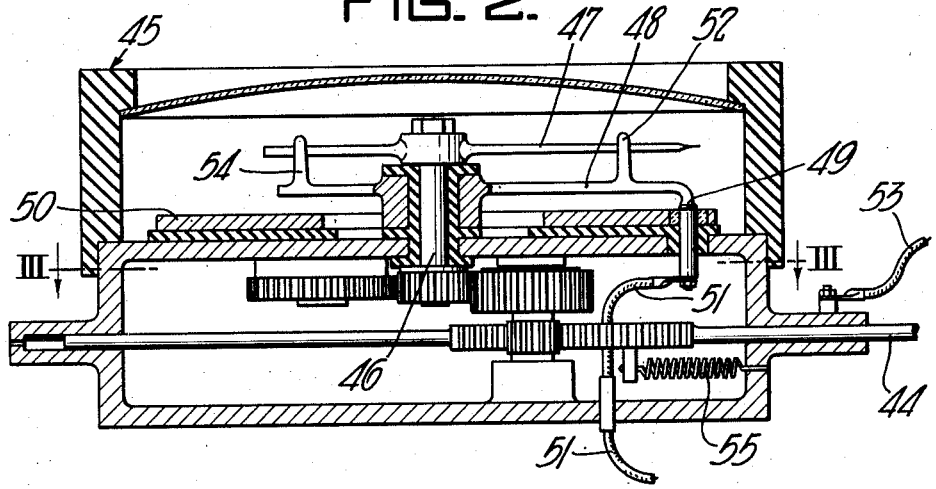
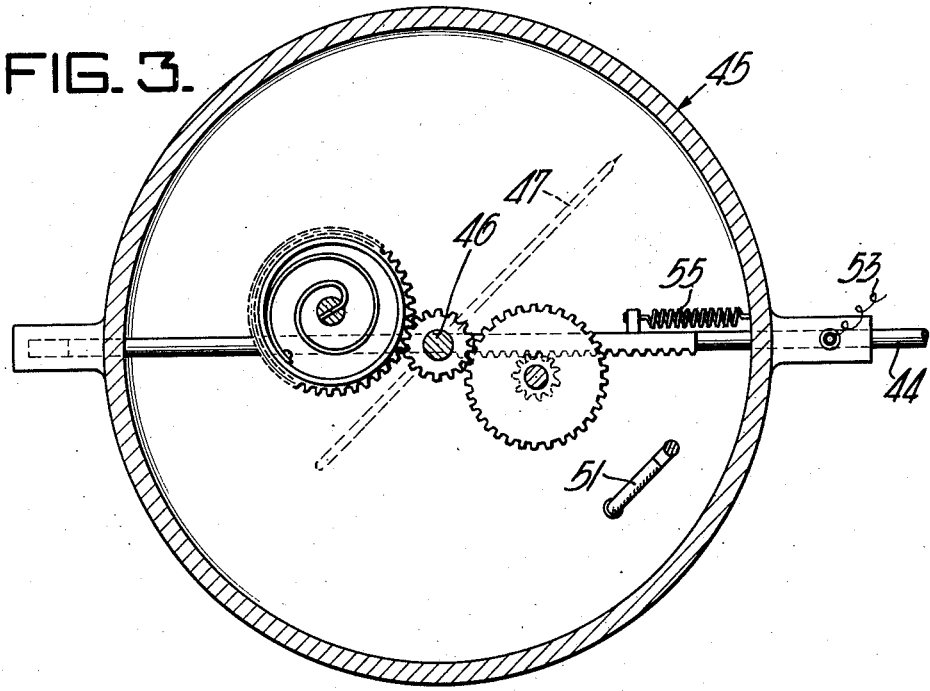

Patented Sept. 28, 1948

2,450,362

UNITED STATES PATENT OFFICE 2,450,362

DEVICE FOR ELECTRIC RESISTANCE HEATING OF METALS AND CONTROLS THEREFOR

William H. Scott, Trenton, N. J., assignor to The American Steel and Wire Company of New Jersey, a corporation of New Jersey Application March 2, 1945, Serial No. 580,680

4 Claims. (Cl. 219—11)

This invention relates to devices for electric resistance heating of metals and controls therefor and particularly to such devices and controls embodied in automatic welding and annealing apparatus of the type used to electric resistance heat and pressure butt weld wire ends together and, subsequently, to electric resistance heat the welded joint and the adjacent wire portions to effect their annealing. Apparatus embodying these features is commercially available. One of its uses is in connection with the drawing of steel wire for butt welding and annealing wire lengths end-to-end to permit the continuous wire drawing of a number of wire coils. The general principles of the invention may be applicable otherwise but they enjoy particular advantages in the field described.

Such apparatus includes a set of jaws, for clamping the wire end portions in alignment which function as electric contactors and are provided with an electric current supply system including an adjustable current controller, at least one of these jaws having an adjustable mount permitting spacing of the contactors different distances so that the lengths of the workpieces on either side of their butted ends may be adjusted as required to control the portions that upset during the welding. Furthermore, these jaws function to mechanically apply the necessary butt welding pressure by being provided with adjustable pressure applying means for forcing the pieces together and with this means provided with a control for varying the butt welding pressure. During the butt welding operation the current supply controller setting and the jaw spacing and butt welding pressure control adjustments represent variables which must be properly set in value, in dependence on the wire sizes and metal composition, if proper butt welding is to be effected. The operators do not always properly set these variables, and one of the advantages of the present invention is that it enables an operator to fix these variables for any particular size and metal composition of work, within a range of sizes and compositions, without resorting to his personal judgment.

Such apparatus also includes a second set of jaws to which the butt-welded wire end portions are transferred and clamped after the butt welding operation, these jaws being also provided with an electric current supply system having an adjustable current controller and with at least one jaw made relatively movable so the current path through the work may be adjusted. In apparatus particularly intended for use with steel wire, having a composition which decalesces when heated to its critical temperature, one of the jaws is made so that it is capable of displacement by thermal expansion of the work clamped between the two jaws, this jaw working a micrometer measuring the expansion of the work and functioning to indicate to the operator when contraction of the work momentarily occurs due to decalescence of the work, the operator then knowing that the critical temperature is reached and it being the practice to continue the heating for a short time thereafter and to then cut off the current from the jaws. Here again variables are involved, these being the spacing of the jaws, the amount of current supplied the jaws to electric resistance heat the work, and the length of time during which the current is continued after decalescence; these variables again depending upon the size and chemical composition of the work and having been left entirely to the operator's judgment. In addition, it has proven very difficult for operators to tell the exact time when decalescence occurs, this demanding their continuous attention and being easily missed in the case of even momentary inattention. With these things in mind, the present invention has the further advantages of providing for the positive spacing of the annealing jaws, the positive control of the current supplied these jaws, the positive and automatic catching of the critical point, and the positive control of the time during which the current is left on after the critical point is reached, all these variables being positively set according to the size and composition of the wire being annealed and not depending on the operator's judgment.

The accompanying drawings schematically illustrate the principles of the invention, the various figures being as follows:

Figure 2 is a vertical section of a detail in Figure 1 that cannot otherwise be adequately illustrated; and Figure 3 is a horizontal section taken from the line III—III in Figure 2.

Figure 1:
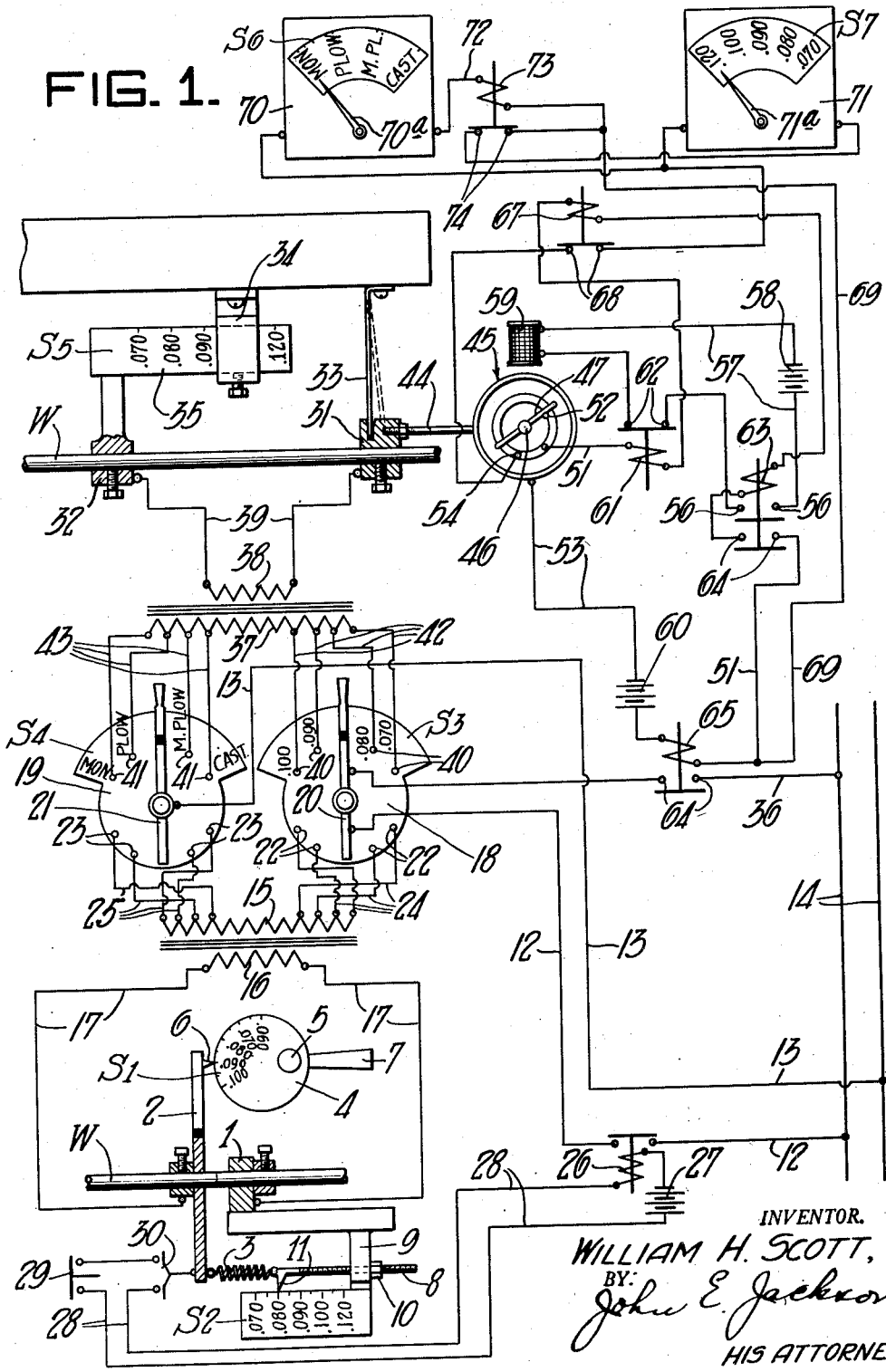
Figure 1 illustrates the general features of the complete example.

More specifically, these drawings illustrate the butt welding jaws clamping the wire end portions W with the wire ends in abutting relationship, one of the jaws 1 being immovably fixed and the other jaw 2 being mounted for movement toward this fixed jaw 1, the butt welding pressure being applied by a spring 3 which urges the jaw 2 toward the jaw 1. The jaw relative spacing is controlled by a cam 4 rotatively mounted on a fixedly positioned shaft 5 and working a cam follower 6 rigidly associated with the movable jaw 2, this cam 4 being manually adjustable by a lever 7 and provided with a scale S1 reading in terms of wire sizes. The tension of the spring 3 is variable because its end that connects with the jaw 2 is secured to a threaded shaft 8 working against a fixed support 9 through the medium of a nut 10 screwed on this rod 8, these parts functioning as a control for the pressure applying means provided by the parts just described, whereby it varies the butt welding pressure, and the nut functioning as an operator for this control. The end of the rod 8 mounts a pointer 11 playing on a scale S2 marked in terms of wire sizes, the nut 10 functioning to work this scale.

The jaws 1 and 2 also function as electric contactors for the work, and they are provided with an electric current supply system in the form of lines 12 and 13 powered by A. C. lines 14 and which connect with the primary 15 of a transformer having its secondary 16 connecting with the jaws 1 and 2 through the lines 17. This system also includes two independently adjustable current controllers 18 and 19 for the current supplied the contactors, which are the jaws 1 and 2, these controllers being in the form of multiple contact switches having manually adjustable contactors 20 and 21 selectively contacting multiple contacts 22 and 23, in each instance, which, respectively, connect through lines 24 and 25 with the opposite ends of the primary 15 so as to include various numbers of turns of these opposite ends. The contactors 20 and 21 function as adjusting operators and each is provided with a scale, S3 and S4 respectively, which it works, the arrangement shown being simply that the operating handles 20 and 21 play over the scales S3 and S4. One of these scales S4 is marked in terms of work chemical compositions and the other, S3, in terms of work sizes, and the scales are calibrated so that when the controller operators 20 and 21 are adjusted to work the scales so they read in terms of the composition and size of the particular work contacted by the contactors, which means that the work is clamped between the jaws 1 and 2, the current supplied the contactors is adjusted to electric resistance heat the work to a predetermined temperature known to be proper for butt welding that particular work as represented by the size and chemical composition of the steel wire clamped between the jaws 1 and 2 for butt welding.

Keeping the above in mind, the scales S1 and S2 are calibrated so that when they are set to the size of the wire end portions to be butt welded, the jaws 1 and 2 are properly spaced to provide the proper upset of the work and the butt welding pressure is properly adjusted, all to predetermined values known to be proper for effecting butt welding of the particular work clamped between the jaws. It is to be understood that prior to butt welding and after the jaws have clamped the wire end portions the lever 7 is operated to throw the cam 4 away from the follower 6 to permit application of the butt welding pressure by the spring 3.

It now is apparent that for an operator to properly butt weld the ends of two wire end portions together he has only to properly set the scales S1, S2, S3 and S4, these being set to the work size and chemical composition of the particular work involved and which are, of course, known to the operator. It follows that no variable is left to the judgment of the operator and proper butt welding is effected.

The welding current is controlled by a relay 26 having its contacts biased to open position and controlling the line 12 and having its solenoid, which closes these contacts when energized, powered by a current source 27 through lines 28 which are, in turn, controlled by a push button switch 29 which, when pushed to closed position, energizes the solenoid of the relay 26 and establishes the welding current power circuit. The lines 28 are also controlled by a switch 30 which is normally closed but which connects with the movable jaw 2 so as to open when this jaw moves towards the jaw 1 under the urge of the butt welding pressure spring 3 at the time when the metal softens sufficiently for butt welding to proceed with consequent upsetting of the weld.

The drawings also illustrate the annealing jaws 31 and 32 clamping the steel wire end portions W after they have been welded, as described, one of the jaws 31 being mounted by a cantilever spring bracket 33 of sufficient stiffness to prevent this jaw 31 from moving during the manual application of the work to the clamps, and the other jaw 32 being mounted for relative movement, respecting this jaw 31, by a bracket 34 and sliding bar 35, the latter bearing indicia marked in terms of the work size and thus providing a scale S5 worked by adjustment of the jaw 32. The work is inserted in the clamps 31 and 32 with the clamp 32 adjusted to work the scale S5 to set it to the size of the work to be annealed, thus providing a predetermined current path through the work, suitable for its size. The jaws 31 and 31 function as electric contactors for the work W and are powered through an electric current supply system in the form of the lines 13 and 36 which connect with the primary 37 of a transformer having its secondary 38 connecting with the jaws 31 and 32 through the lines 39. This system includes the two independently adjustable current controls 18 and 19 for the current supplied the contactors, which are the jaws 31 and 32, the manually adjustable contactors 20 and 21 of these controllers contacting multiple contacts 40 and 41, in each instance, which, respectively, connect through lines 42 and 43 with the opposite ends of the primary 37 so as to include various numbers of turns of these opposite ends. The contactors 20 and 21 again function as adjusting operators, as described in connection with the butt welding operation, and are set as described, in that connection, so as to properly carry out the annealing. In most instances the scales S3 and S4 remain set during the annealing as they were set for the butt welding since it is the same butt welded work that is transferred to the annealing jaws, because, assuming the scale S5 to be appropriately set, the annealing current is then proper for the size and chemical composition of the wire being annealed as was the current for the butt welding.

It has been noted that the work W is in the form of steel wire that decalesces when it is heated to its critical temperature, and the drawings illustrate the jaw 31 as working the operating rod 44 of the micrometer provided for the purpose of measuring the contraction of the work W which occurs as it decalesces at its critical temperature. However, this micrometer 45 is converted into an electric circuit making and breaking device for the purpose of automatically catching the decalescence point of the work in a manner that will now be described.

The regular indicating needle shaft 46 is lengthened and the regular needle is substituted by an electric contactor bar 47, the lengthened shaft 46 having an electric contact bar 48 insulatingly journaled on it, beneath the bar 47, with a depending contactor 49 sliding on an annular slip ring 50 insulated from the micrometer housing and electrically connecting with a line 51, the contact bar 48 also having an upstanding contact 52 which is engaged by the contactor bar 47 so as to establish electrical contact with it, the bar 47 grounding with the micrometer housing through its shaft 46, and the usual mechanism, and a line 53 connecting with the grounding micrometer housing. With this arrangement, as long as the work W is expanding and the micrometer push rod 44 is continuously rotating the contactor bar 47, an electric circuit is established between the lines 53 and 51 by way of the contactor bar 47, the contact 52, the brush 49 and the slip ring 50, and as soon as decalescence occurs so that the push rod 44 is moved the opposite way slightly, the contactor bar 47, by its retreat, separates from the contact 52 so as to break this electric circuit. After annealing is completed and the work is removed from the annealing jaws, the push rod 44 returns to its normal position through the elasticity of the spring bracket 33 replacing it to its initial position, in conjunction with the usual spring return action of the micrometer push rod, a resetting bar 54 on the contact bar 48 being arranged for engagement by the contactor bar 47 so the latter returns the contact bar 48 almost to its starting position and within the field of the solenoid 59, a spring 55 effecting the usual spring return action of the micrometer.

With the work W clamped in the jaws 31 and 32 which function as electric contactors, a push button is pressed so as to close contacts 56 which then, through line 57 powered by an electric power source 58, energize a solenoid 59 mounted outside of the converted micrometer so as to attract its electric contact bar 48 and pull it back until its contact 52 engages the contactor bar 47, the micrometer housing being made of non-magnetic material and this contact bar 48 being made of magnetic material so as to permit this action. This closes the circuits through the lines 51 and 53 which are powered by an electric current source 60 so as to energize the solenoid 61 of a relay having its contacts 62 in circuit with the line 57, this opening these contacts 62 so as to deenergize the solenoid 59, while also energizing a solenoid 63 of a relay so as to close its contacts 64 which are in circuit with the line 51, this latter relay being a part of the push button arrangement which closes the contacts 56, the circuit through the lines 51 and 53 now being completed and effecting energization of the solenoid 65 of a relay having its contacts 64 in the line 36, this closing the lines 13 and 36 and establishing the annealing circuit by connecting the primary 37 of the transformer, having its secondary 38 electrically powering the jaws 31 and 32, to the power lines 14.

The work W, clamped in the jaws 31 and 32, now proceeds to heat and expand until it decalesces, and when decalescence occurs the contactor bar 47 backs away from the contact 52 of the contact bar 48, this breaking the circuit between the lines 51 and 53 so as to deenergize the solenoids 61 and 63, whereby the contacts 56 and 64 open so as to deenergize the solenoid 65 insofar as the circuit established by the lines 51 and 53 is concerned and contacts 62 close. However, deenergization of the line 51 deenergizes the solenoid 67 of a relay whose contacts 68 then close so as to establish a circuit through the line 53 and the line 69, the lines 53 and 69 being also in circuit with the solenoid 65 so as to keep this energized, whereby the jaws continue to be supplied with current even though decalescence has occurred. This line 69 includes two time delay relays 70 and 71, with the relay 70 shunted around the relay 71 by a branch line 72 including the solenoid 73 of a relay having its contacts 74 in circuit with the portion of the line 69 which the line 72 shunts around, whereby the relay 70 operates for a predetermined time dependent upon its setting; and then, upon deenergization of the line 72 by opening of the contacts of the relay 70, the relay 71 goes into operation through closing of the contacts 74, this further prolonging the time during which the circuit is maintained through the lines 53 and 69 and the solenoid 65, this circuit being broken only upon expiration of the time for which the relay 71 is set to maintain its contacts closed, whereupon the solenoid 65 deenergizes and no more current reaches the jaws 31 and 32, this marking the termination of the annealing cycle.

For convenience, I designate the circuit that includes lines 51 and 53 and relay coils 61, 63, 65 and 67 as the "control circuit," and the circuit that includes lines 53 and 69 and relay coils 65, 70, 71 and 73 as the "auxiliary control circuit." It is seen that relay coil 65 is energized when current flows either in said control circuit or in said auxiliary control circuit.

Now the relays 70 and 71 are each of the type having an adjustment indicator hand, 70a and 71a respectively, which normally plays over a scale calibrated in terms of time, and which operates so that when a circuit is established through the contacts of the relay it is maintained for a period of time, depending upon the adjustment, and then terminated automatically. In the present instance, the indicating hands 70a and 71a play over scales S6 and S7 which respectively read in terms of work composition and work size and which are respectively calibrated so that when the two are appropriately set, as previously described in connection with the other scales, the annealing time duration is proper for work of its size and composition. Obviously, the operator's judgment plays no part in this, the annealing cycle being automatically started and, at a predetermined time after decalescence of the work, terminated.

I claim:

1. A device for electric resistance heating metals that decalesce when heated above a predetermined temperature comprising means for engaging metal at opposite sides of a region to be heated, a heating circuit for passing current through the metal and thereby heating it, a control circuit, an auxiliary control circuit, relay means in said control and auxiliary control circuits energizing said auxiliary control circuit on interruption of said control circuit, means interrupting said control circuit on decalescence of the metal, and time delay means in said auxiliary control circuit for interrupting said heating circuit after a predetermined interval, independent of dimensional changes in the metal after decalescence.

2. A device for electric resistance heating metals that decalesce when heated above a predetermined temperature comprising a pair of clamps for engaging metal at opposite sides of a region to be heated and being relatively movable, a heating circuit for passing current through the metal and thereby heating it, an electromagnetic relay having contacts in said heating circuit for making and interrupting said circuit, a control circuit, an auxiliary control circuit, the coil of said relay being in both said control circuit and said auxiliary control circuit, means movable with dimensional changes in metal held in said clamps for interrupting said control circuit on decalescence of the metal, means in said control circuit for energizing said auxiliary control circuit on interruption of said control circuit, and time delay means in said auxiliary control circuit for interrupting the circuit to said relay after a predetermined interval, independent of dimensional changes in the metal after decalescence.

3. A device for electric resistance heating metals that decalesce when heated above a predetermined temperature comprising a pair of clamps for engaging metal at opposite sides of a region to be heated, one of said clamps being movable with respect to the other, a heating circuit including conductors connected to said clamps for passing current through the metal and thereby heating it, an electromagnetic relay having contacts in said heating circuit for making and interrupting said circuit, a control circuit, an auxiliary control circuit, the coil of said relay being in both said control circuit and said auxiliary control circuit, means movable with said movable clamp on dimensional changes in metal held in said clamps and including contacts for making and interrupting said control circuit, said contacts separating on decalescence of the metal and thereby interrupting said control circuit, relay means in said control circuit for energizing said auxiliary control circuit on interruption of said control circuit, and time delay means in said auxiliary control circuit for interrupting the circuit to said first relay after a predetermined interval, independent of dimensional changes in the metal after decalescence.

4. The combination of two electric contactors for contacting metal work to be electric resistance heated and which are spaced apart a predetermined distance to define a predetermined current path through the work, and an electric current supply system for these contactors including two independently adjustable current controllers for the current supplied the contactors with each controller having an adjusting operator therefor and a scale worked by this operator, one of these scales being marked in terms of work chemical compositions and the other in terms of work sizes and the scales being calibrated so that when the controller operators are adjusted to work the scales so they read in terms of the composition and size of the particular work contacted by the contactors the current supplied the latter is adjusted to electric resistance heat this work to a predetermined temperature, the work being made of ferrous metal that decalesces as it is heated above a predetermined temperature and the current supply system including two sequentially operating independent adjustable time delay devices for automatically discontinuing the current supply to the contactors and means for placing these devices in operation which is automatically operated by decalescence of the work contacted thereby, each of the devices having an adjusting control working a scale with one scale marked in terms of work sizes and the other in terms of work chemical composition and these latter scales being calibrated so that when set as are the first named two scales the current supply to the contactors is continued for a predetermined time after decalescence of the work and is then automatically discontinued.

WILLIAM H. SCOTT.

REFERENCES CITED

The following references are of record in the file of this patent:

UNITED STATES PATENTS

| Number | Name | Date |
| --- | --- | --- |
| 347,140 | Thomson | Aug. 10, 1886 |
| 1,402,722 | Josephs et al. | Jan. 3, 1922 |
| 1,402,723 | Josephs et al. | Jan. 3, 1922 |
| 1,414,366 | MacDonald | May 2, 1922 |
| 1,501,369 | Ramondo | July 15, 1924 |
| 1,760,155 | MacDonald et al. | May 27, 1930 |
| 1,877,874 | Hopkins | Sept. 20, 1932 |
| 2,015,184 | Hopkins | Sept. 24, 1935 |
| 2,018,379 | Pfeiffer | Oct. 22, 1935 |
| 2,175,022 | Gilbert | Oct. 3, 1939 |
| 2,337,124 | Olving | Dec. 21, 1943 |